United States Patent

Kume et al.

[11] 4,199,699
[45] Apr. 22, 1980

[54] MOTOR AND DRIVE FOR A TIMEPIECE

[75] Inventors: Kazunari Kume; Minoru Watanabe, both of Tokorozawa; Hideshi Ohno, Sayama; Munetaka Tamaru, Tokyo; Takayasu Machida, Iruma; Seiichi Nakamura, Tokyo; Shigeru Morokawa, Higashi Yamato, all of Japan

[73] Assignee: Citizen Watch Co., Ltd., Tokyo, Japan

[21] Appl. No.: 639,987

[22] Filed: Dec. 11, 1975

[30] Foreign Application Priority Data

Dec. 16, 1974 [JP] Japan .................. 49-144296

[51] Int. Cl.² ............................................. H02K 37/00
[52] U.S. Cl. .......................... 310/49 R; 310/40 MM; 310/83; 368/126
[58] Field of Search ............... 310/40 MM, 49, 162, 310/163, 164, 83, 156, 75; 58/23 D; 74/426

[56] References Cited

U.S. PATENT DOCUMENTS

| 781,600 | 1/1905 | Hamachek | 74/426 |
| 2,912,604 | 11/1959 | Eurich | 310/40 MM |
| 3,374,689 | 3/1968 | Dotto | 74/426 |
| 3,432,699 | 3/1969 | Albinger | 310/162 |
| 3,818,690 | 6/1974 | Schwarschild | 58/23 D |
| 3,878,414 | 4/1975 | Harakawa | 310/162 |
| 3,883,758 | 5/1975 | Lechner | 310/162 |
| 3,900,749 | 8/1975 | Carriker | 310/156 |
| 3,949,251 | 4/1976 | Takatsuki | 58/23 D |
| 3,969,642 | 7/1976 | Yoshino | 310/49 |

Primary Examiner—R. Skudy
Attorney, Agent, or Firm—Koda and Androlia

[57] ABSTRACT

An electronic timepiece including a battery, a drive motor, a drive, a display, and electronic circuits for driving said motor. The motor is a pulse motor and comprises a core, coil, yoke and rotor. The rotor includes a worm gear having worm teeth which engage with a gear wheel. The teeth on the worm gear are arranged and configured such that the initial and final portions of each tooth which engage with the gear wheel are parallel to the plane of rotation of the rotor thereby preventing torque applied to the gear wheel from being transmitted to the rotor.

6 Claims, 10 Drawing Figures

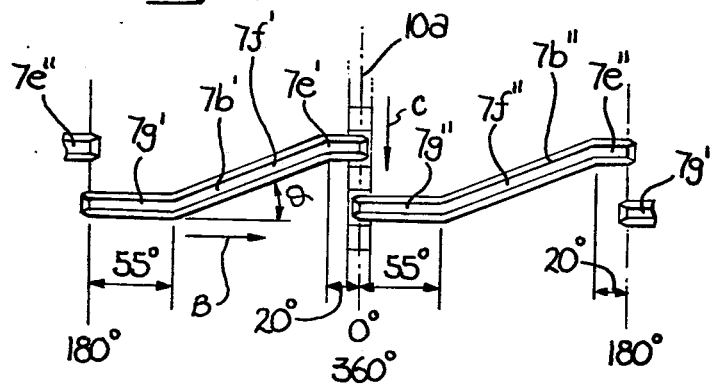
Fig. 5
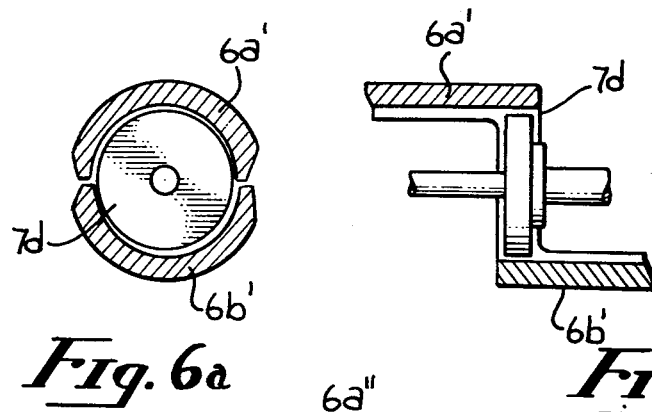
Fig. 6a  Fig. 6b
Fig. 7
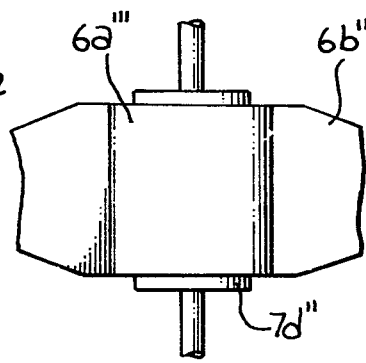
Fig. 8a
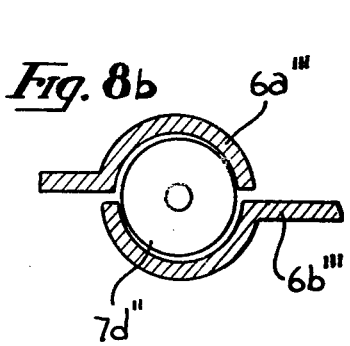
Fig. 8b

MOTOR AND DRIVE FOR A TIMEPIECE

FIELD OF INVENTION

This invention relates to electronic timepieces having analog displays and more particularly to electronic timepieces that utilize a pulse motor and drive.

DESCRIPTION OF PRIOR ART

In electronic timepieces utilizing a mechanical display, especially wristwatches, a pulse motor with six or two magnetic poles is utilized to operate the mechanical display. Frequently the pulse motor is coupled to the display via a gear train having spur teeth. Since the pulse motor is continually in engagement with the mechanical display, any torque applied to the display is transmitted to the pulse motor. An example of such a torque is when the position of the time pointers is being adjusted by rotating the stem. The torque applied to the time pointers is transmitted by the gear train to the pulse motor thereby causing rotation of the rotor of the pulse motor. Such rotation of the pulse motor by an external force is undesirable because it may effect the accuracy of the timepiece and/or damage the pulse motor.

To prevent application external torques to the pulse motor, at least two remedies have been utilized by the prior art. One remedy is mechanically engaging a restraint lever against the rotor axis. The other is to put a braking force on the gear train. Both of these methods are undesirable because they add to the complexity of the watch and therefore increase the size and cost.

SUMMARY OF THE INVENTION

In keeping with the principles of the present invention, the objects are accomplished by an electronic timepiece including a battery, a drive motor, a mechanical display, a gear drive system coupling the drive motor to the mechanical display, and electronic circuits for driving the motor. The motor is a pulse motor and comprises a core, coil, yoke, and rotor. The pulse motor rotor includes a worm gear having worm teeth which engage with a wheel gear which is part of the drive train. The rotor is mounted parallel to the core and the teeth on the worm gear are arranged and configured such that the initial and final portions of each tooth which engage with the wheel gear are parallel to the plane of rotation of the rotor. Since the initial and final portions of each tooth are parallel to the plane of rotation of the rotor, external torques applied to the drive train are prevented from being transmitted to the rotor.

Accordingly, it is a general object of the present invention to provide a means for coupling the pulse motor of a timepiece to the drive train of the timepiece which does not transmit external torques applied to the drive train to the pulse motor. It is another object of the present invention to provide a timepiece which is less complex and easier to assemble.

It is another object of the present invention to provide a timepiece which is lower in cost.

BRIEF DESCRIPTION OF DRAWINGS

The above-mentioned and other features and objects of the present invention will become more apparent by reference to the following description taken in conjunction with the accompanying drawings, wherein like reference numerals denote like elements, and in which:

FIG. 5 is a view of the teeth of the rotor worm gear around the axis developed in a plane.

FIG. 6 is an embodiment of the yoke and wherein FIG. 6A is a front view and 6B is a side view of a section of FIG. 6A.

FIG. 7 is another embodiment of the rotor and yoke shown in a side sectional view.

FIG. 8 is a third embodiment of the yoke and rotor wherein FIG. 8A is a view from above and FIG. 8B is a cross-section of FIG. 8A.

DESCRIPTION OF THE PREFERRED EMBODIMENT

Figure 1:
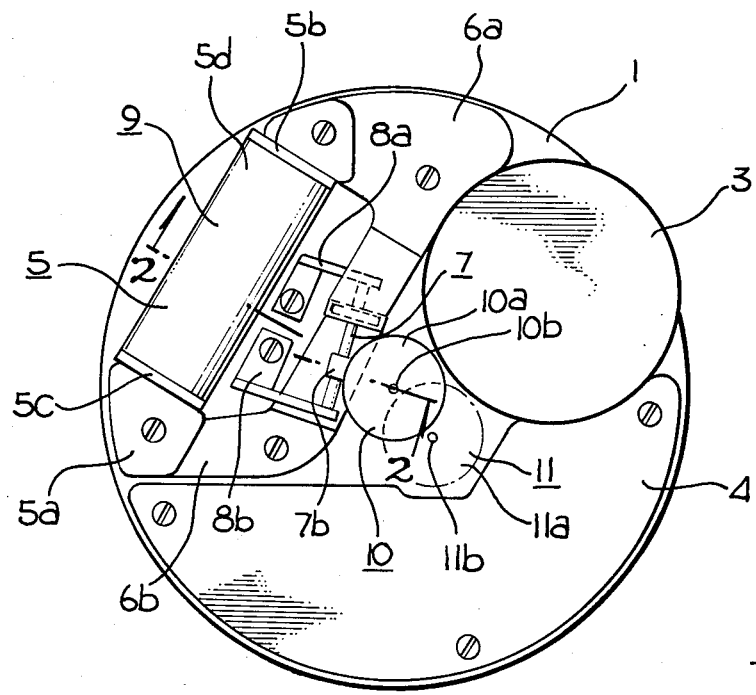
FIG. 1 is a front view of an embodiment of the present invention.

Referring to FIGS. 1 through 5, the electronic timepiece includes a base plate 1. Battery 3 which powers the timepiece is mounted on base plate 1. Circuit frame 4 is coupled to base plate 1 and contains an oscillator circuit, a quartz crystal, frequency divider circuits, and a motor driving circuit. Pulse motor 9 is mounted on a base plate 1 and comprises a iron core 5a a coil 5 would on said iron core, yokes 6a, and 6b, rotor 7 and rotor supports 8a and 8b. Coil 5 includes coil frames 5a and 5c and coil windings 5d. Rotor 7 comprises a rotor axle 7a, a rotor worm gear 7b which is coupled to rotor axle 7a and having teeth 7b' and 7b" which are of worm type, and magnet seat 7c that axially fixes driving magnet 7d. Magnet 7d is magnetized in circumferential and opposing directions and has two magnetic poles and is arranged parallel to coil 5. Yokes 6a and 6b are arranged against each other and enclose the circular contour of driving magnet 7d while the other ends of yokes 6a and 6b are coupled to the ends of coil 5 to form a magnetic circuit.

Fourth wheel and pinion 10 and third wheel and pinion 11 are located in the central portion of base plate 1 and are supported by gear train frame 2. Fourth wheel and pinion 10 comprises a fourth wheel 10a and a fourth pinion 10b. Third wheel and pinion 11 comprises third wheel 11a and third wheel pinion 11b. Fourth wheel 10a is engaged with rotor worm gear 7b such that the plane of rotation is orthoginal to each other and one-half revolution of rotor 7 causes fourth wheel 10a to turn 1/60th of a revolution. Torque transmission after the fourth wheel 10 are performed in the same manner as in conventional timepieces; the mechanism being such that the torque is successively transmitted via third wheel 11, the second wheel (not shown) etc..

In operation, alternating pulses with a one second time interval are fed into coil 5 from the circuits which are contained on circuit holder 4. As a result, once every second an alternating magnetic flux flows through iron core 5a, yoke 6a and yoke 6b. Since driving magnet 7d has two magnetic poles and its stationary position is determined by its reaction to the phase condition of the magnetic field in opposing yoke 6a and 6b, driving magnet 7d starts to rotate as indicated by the arrow in FIG. 2 when the phase condition of opposing yoke 6a and 6b is reversed and becomes stationary after half of a revolution. The driving magnet 7d thus turns one-half of one revolution in one direction for each pulse input and thus transmits its torque to the fourth wheel 10a. The resulting motion of driving magnet 7d appears on the pointer needle for seconds (not shown) as a repetitive quick movement and stop on the second scale.

Figure 4:
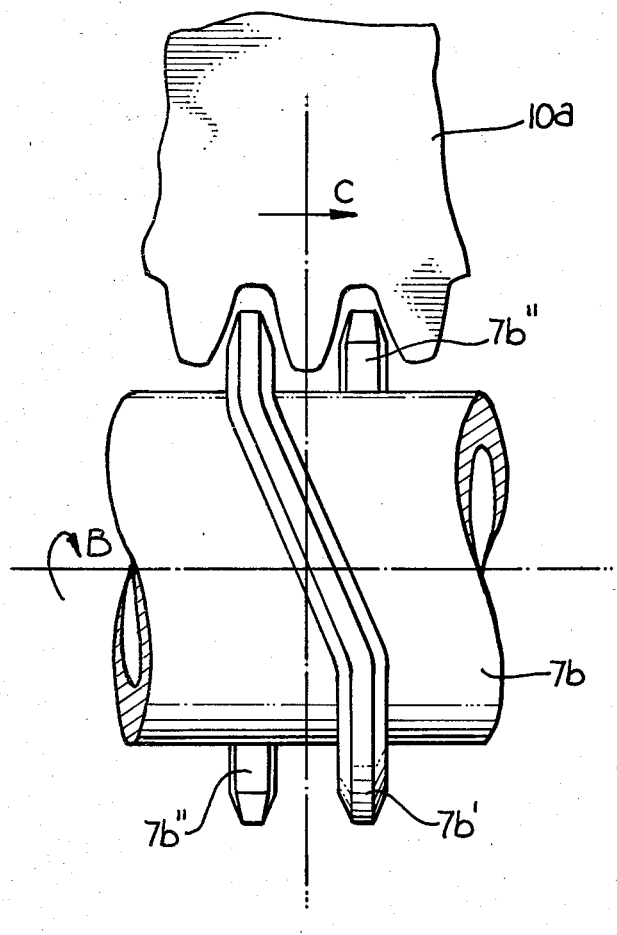
FIG. 4 is an enlarged view of the rotor worm gear together with the gear wheel of the embodiment of FIG. 1.

Referring to FIGS. 4 and 5, shown therein are features of the present invention. FIG. 5 is the rotor worm gear 7b drawn on a developed plane. Teeth 7b' and 7b" comprise initial engagement sections 7e' and 7e", driving sections 7f and 7f' and final engagement sections 7g' and 7g". The initial sections 7e' and 7e" and the final sections 7g' and 7g" are parallel to the plane of rotation of rotor worm gear 7b (the plane of rotation is perpendicular to the paper and includes arrow B in it), and moreover the initial sections 7e' and 7e" and the final sections 7g' and 7g" are located in the same plane of rotation respectively but 180 degrees out of phase. Furthermore, the initial section 7e' and the final section 7g" and the initial section 7e" and the final section 7g' are so formed that a tooth of fourth wheel 10a is interposed between the pair of teeth when rotor worm gear 7b is at its stationary position, as shown in FIG. 4.

In operation, when rotor 7 is in the stationary position, fourth wheel 10a is stopped while engaged with initial section 7e' or 7e" and final section 7g' or 7g' of rotor gear 7b. When rotor worm gear 7b begins to rotate as indicated by arrow B, the fourth wheel 10a, guided by tooth 7b', will move in the direction of arrow C, the motion being equal to one tooth pitch distance of wheel 10a for every half turn of rotor worm gear 7b.

The present invention, the teeth 7b' and 7b" of rotor worm gear 7b are characterized by the existence of two independent teeth 7b' and 7b" each having initial and final sections of engagement that are parallel to the plane of rotation of rotor worm gear 7b. The initial and final section 7e' and 7e" and 7g' and 7g" of each tooth are connected by a driving section 7f and 7f' that has a predetermined angle of inclination against the plane of rotation of rotor worm gear 7b. The starting section of tooth 7b' and the ending section of tooth 7b" overlap, as shown in FIG. 5, such that a tooth of fourth wheel 10a lies between them. By means of the present invention described above, when rotor 7 is stopped at its stationary position, the transmission of reciprocating rotation from fourth gear wheel pinion 10 to pulse motor 9 is stopped. The stationary position of rotor 7 may deviate from its designed point due to error in machining, errors in assembly of adjustments, but a certain deviation in the stationary position does not effect the feed motion. Since rotor 7, in its initial phase of rotation, is engaged with fourth wheel 10a through an initial section 7e' or 7e" or and ending section 7g' or 7g", both of which are parallel to the plane of rotation of rotor 7, rotor 7 starts to rotate easily. Because of the initial section 7e' and 7e" and final sections 7g' and 7g",the rotation of fourth wheel 10a is characterized by a quick start and quick stop type movement that contributes to a clear cut motion of second pointer needle (not shown) that is attached to fourth wheel and pinion 10. External loading torques applied to fourth wheel and pinion 10 when the position of the pointer needle is being adjusted, or by other causes, does not effect the stationary position of rotor 7 since in the stationary position fourth wheel 10a cannot rotate rotor worm gear 7b. Consequently, devices such as restraint levers or brakes on the gear train which are needed in conventional designs are not necessary.

In practice, the detailed dimensions of teeth 7b' and 7b" of rotor worm gear 7b of this embodiment can be:

angle of initial sections 7e' and 7e" measured at the center of rotor worm gear 7b is about 20 degrees;

angle of the final sections 7g' and 7g" measured at the center of rotor worm gear 7b is about 55 degrees;

the angle of inclination of driving section 7f and 7f' relative to the plane of rotation of rotor worm gear 7b is about 20 degrees.

The configuration given above results in satisfactory functions.

Figure 2:
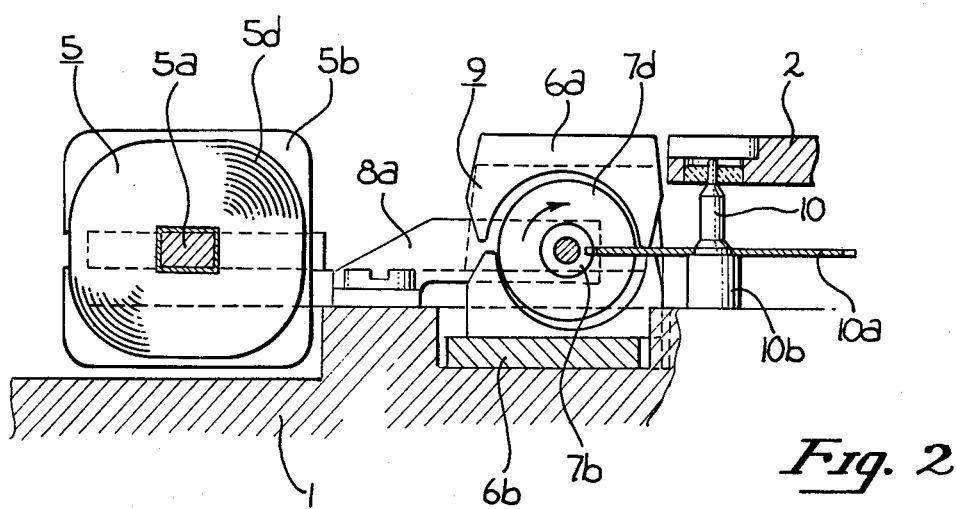
FIG. 2 is a section view along the line 2—2 in FIG. 1.
Figure 3:
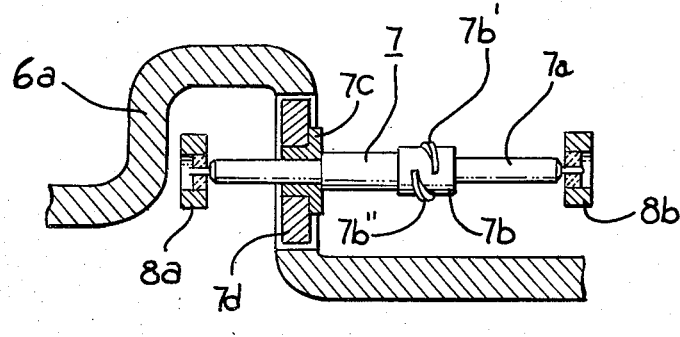
FIG. 3 is a section view along the rotor axis of the embodiment of FIG. 1.

FIG. 6 shows an embodiment of the rotor and yoke for the present invention in which only the yokes 6a' and 6b' are different from that shown in FIGS. 1 through 3. Yokes 6a' and 6b' are placed facing each other around a driving magnet 7d. The difference of this embodiment from the preceding embodiment is that the punching or metal cutting process on the portions of the yokes 6a' and 6b' connect them to driving magnet 7d are abolished. The portions of yokes 6a' and 6b' coupled to driving magnet 7d are in this embodiment formed by bending.

FIG. 7 shows another embodiment of rotor and yokes for the present invention in which the axial length of driving magnet 7d' of rotor 7 is made long. In conventionally used rotors which are longitudinal type (in which the rotor axis is perpendicular to the base plate), especially those found in wristwatches and other portable timepieces, there has been a limit in the thickness of the driving magnet because it is objectionable to make the timepiece thick, despite the merits such an increase output of a rotor (and consequently a saving in electical power consumption) when it is made thicker. Since an increased thickness in the rotor in the present invention does not result in a increased thickness of the timepiece, it is possible to realize a timepiece that has a motor with increased rotor output, or a motor that operates with a lower consumption of electrical power.

FIG. 8 shows an embodiment of the rotor and yoke in which the form of the yoke 6a" and 6b" in FIG. 7 is varied in such a way that yoke 6a''' and 6b''' now embrace the driving magnet 7d''. This embodiment makes the arrangement of rotor axle bearings even simpler. The detailed description of the present invention given may be variously modified without deviating from the spirit and scope of the present invention. For instance, it is possible to make the starting of rotor 7 even easier by applying a weak index spring on fourth wheel 10 and providing small tabs between a tooth on fourth wheel 10a and teeth 7b' and 7b" of rotor worm gear 7b at a stationary position of rotor 7; it is possible to improve space efficiency by configuration of yokes 6a' and 6b' shown in FIG. 6a; it is possible to make fabrication of the yokes easier by bending or to make arrangement of the yoke support easier by adopting lateral instead of longitudinal disposition among the yokes; it is possible to facilitate the arrangement of the yoke supports by making a hole in the yokes and putting rotor axle 7a through the hole; it is possible to facilitate assembly by supporting one end of the rotor 7 by a horizontal hole that is made on base plate 1 and it is even easier to make a rotor support which is one block with base plate 1 where base plate 1 is manufactured by plastic molding. Furthermore, the within description is not meant to be limited to a driving magnet of only two poles or that the number of teeth on the rotor worm gear is limited to only two.

In all cases it is understood that the above-described embodiments are merely illustrative of but one of many possible specific embodiments which represent the application of the principles of the present invention. Furthermore, numerous and varied other arrangements can readily be devised in accordance with the principles of the present invention by those skilled in the art without departing from the spirit and scope of the present invention.

We claim:

1. A pulse motor for a timepiece comprising:
   an iron core;
   a coil wound on said core;
   a rotor, said rotor being substantially parallel to said iron core and comprising:
   a shaft;
   a driving magnet coupled to said shaft; and
   a worm gear coupled to said shaft, said worm gear having a plurality of teeth with initial and final sections that are parallel to the plane of rotation of said rotor, said initial and final sections being connected together by a driving section at some angle with the plane of rotation of said rotor; and
   a pair of yokes, said yokes being coupled at one end to said core and enclosing said driving magnet at the other end.

2. A pulse motor according to claim 1 in which the driving magnet of said rotor is constructed such that the ratio of the radius versus the axial length is less than one.

3. A pulse motor according to claim 1 wherein said driving magnet is magnetized in the circumferential and opposing directions and has two magnetic poles.

4. A pulse motor according to claim 1 wherein the initial and final sections of consecutive worm gear teeth overlap in a plane which is normal to the plane of rotation.

5. A pulse motor according to claim 3 wherein said worm gear has two teeth.

6. A pulse motor according to claim 1 wherein said driving magnet is magnetized in circumferential and opposing directions and has a plurality of magnetic poles.

* * * * *